United States Patent [19]

Maternus

[11] 4,395,167
[45] Jul. 26, 1983

[54] ROUTER ESPECIALLY FOR USE AS A FIBER-METAL CUTTER

[75] Inventor: Fred Maternus, Chicago, Ill.

[73] Assignee: National Carbide Tool, Inc., Skokie, Ill.

[21] Appl. No.: 241,489

[22] Filed: Mar. 9, 1981

[51] Int. Cl.³ .......................... B26D 1/12; B23B 27/10
[52] U.S. Cl. .......................................... 407/54; 408/54
[58] Field of Search ..................... 144/22, 26, 58, 219;
   407/34, 42, 53, 54; 408/230, 26

[56] References Cited

U.S. PATENT DOCUMENTS

| | | | |
|---|---|---|---|
| 2,081,487 | 12/1935 | Lane | 408/58 |
| 2,918,955 | 12/1959 | Simas | 408/230 |
| 3,037,264 | 6/1962 | Mossberg | 407/53 |
| 3,058,199 | 10/1962 | Cave et al. | 407/54 |
| 3,456,316 | 8/1967 | Dawson | 407/53 |
| 3,863,316 | 2/1975 | Yeo | 408/230 |
| 3,913,196 | 10/1975 | Maday | 407/54 |
| 4,285,618 | 8/1981 | Shanley, Jr. | 407/54 |

FOREIGN PATENT DOCUMENTS

| | | | |
|---|---|---|---|
| 771631 | 10/1934 | France | 407/54 |
| 25179 | of 1907 | United Kingdom | 408/223 |

Primary Examiner—Robert E. Garrett
Assistant Examiner—Paul M. Heyrana, Sr.
Attorney, Agent, or Firm—Laff, Whitesel, Conte & Saret

[57] ABSTRACT

A router is made from a carbide shaft or rod which has two sets of flutes, which preferably turn in the same direction and overlap each other in each and every circumference of the fluted part of the shaft. One set of flutes has a slow spiral and sharp cutting edges. The other set of flutes has a fast spiral and a clean out groove with a large cross section. The rod turns, for cutting, in a direction which drives chips, dust, and other debris downwardly where they are drawn off by a vacuum cleaner. The air draft of the vacuum cleaner passes through the flutes and cools the cutting edges.

14 Claims, 12 Drawing Figures

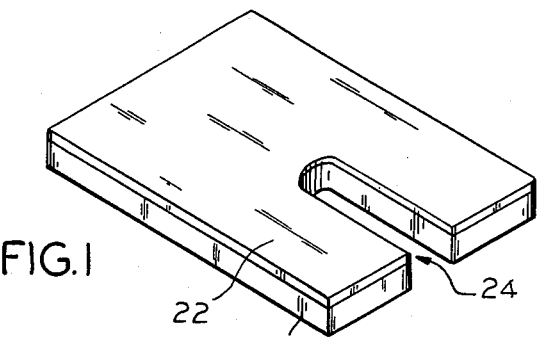
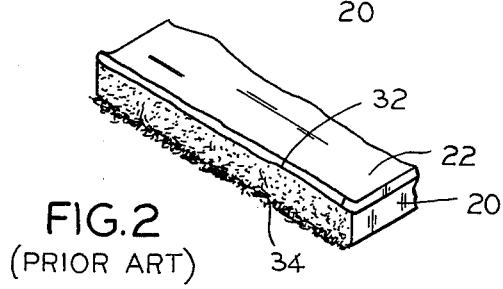
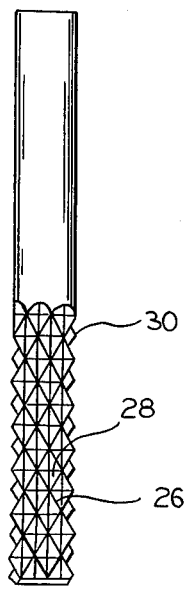
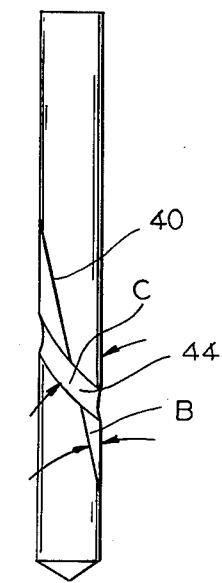
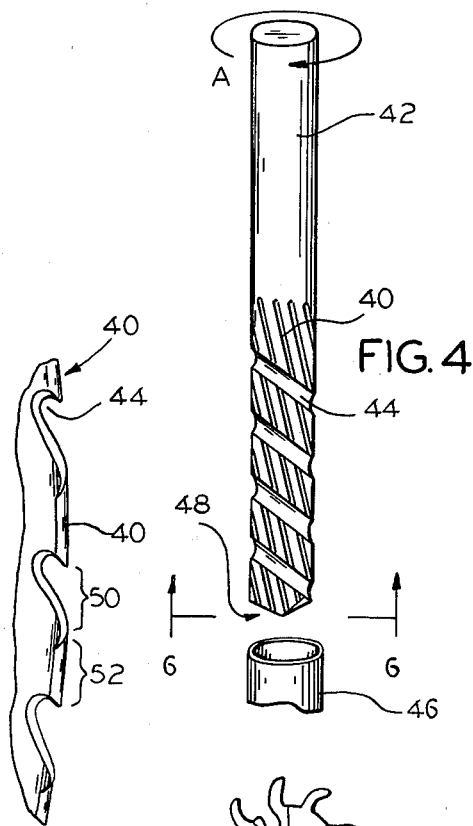
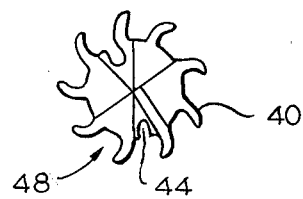
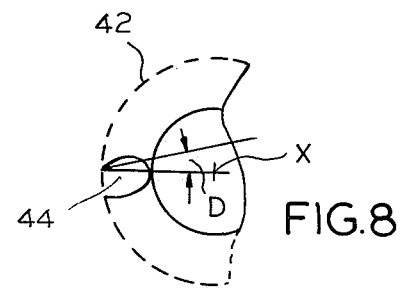
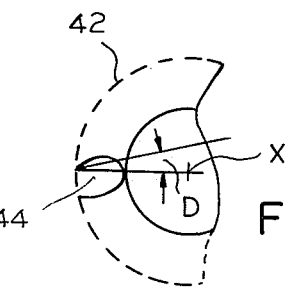
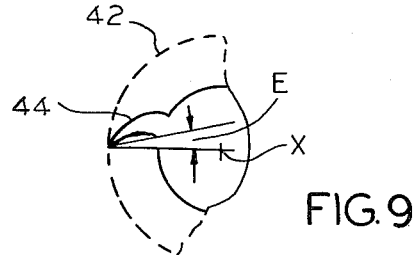

ROUTER ESPECIALLY FOR USE AS A FIBER-METAL CUTTER

This invention relates to cutting tools and more particularly to routers for tough, hard to cut materials, and especially—but not exclusively—composite plastic materials with a liminated metal surface.

The terms "fast spiral" and "slow spiral" are used within their normal meaning in the art. For example, every fluted cutting tool has some "standard" flute, depending upon the material which is being cut, the anticipated cutting speed, type of cutting tool, etc. Thus, for many uses, one might think of a helix angle of, say, 25°-35° as a standard cutting flute. A "slow" spiral has a smaller helix angle, and a "fast" spiral has a larger helix angle. Hence, in the 25°-35° "standard" flute set forth above, a "fast" spiral has a helix angle greater than 35° and a "slow" spiral has a helix angle which is less than 25°.

The invention finds special advantage for use with any of many materials which are very difficult to cut. Exemplary of such materials are a number of new composite plastics, such as those which are made of a resin reinforced with fibers of glass, carbon, boron or Kevlar (a du Pont product). Sometimes, an extremely thin sheet or layer of metal may be laminated on at least one surface of the plastic. This kind of material is often used for body parts of airplanes and automobiles, for example.

The composite plastic material is both stronger and lighter than the metal, which it replaces. It is very tough and offers any cutting edge a much greater resistance than the more conventional materials, and the cutting edge must be rotated very quickly. This causes substantial amounts of friction heating. The faster the cutting tool is operated, the greater the amount of friction that is generated. As a result, cutting tools of the described type which were used heretofore have had a very limited life span, often heating to very high temperatures and breaking soon after they are put into use.

Yet, another problem with prior art cutters is that they tended to cause the cut material to chatter and to feather the cut edge, often gouging and tearing any metal surface in the process. These prior tools accumulate dust in their flutes and have produced an atomosphere ladened with an undue amount of chips, sawdust, and the like, which are health hazards to persons who are nearly enough to breathe the resultant dust ladened air. This hazard is especially severe with the newer plastic materials.

Accordingly, an object of the invention is to provide new and improved cutting tools of the described type, with extended life spans, which give a cut which is cleaner than the cuts provided heretofore.

Another object of the invention is to provide means for and methods of cutting especially tough material. In particular, an object is to provide tools for cutting composite plastics and especially for cutting metal clad composite plastic.

Still another object is to provide a router having a cooler cutting edge for the described purposes.

Yet, another object of the invention is to provide a cutter having a cutting edge which remains free of accumulated dust and does not create a hazardous environment for the workers using the cutter.

In keeping with an aspect of the invention, these and other objects are accomplished by a router having a plurality of cutting flutes with intersecting cleaning flutes. The pitches of these two series of flutes and the turning direction of the router are such that chips and sawdust are driven downwardly through a kerf, and under the material being cut. The cutter turns in a direction which presses the work piece material being cut against its underlying support, thus eliminating chatter at the cutting edge and feathering at the top of the material. Since chatter is eliminated, the bottom edge is also cut much cleaner. Also, cooling air is drawn through the flutes by a vacuum system beneath the work piece, which is used to carry away chips and dust, thereby tending to reduce both the health hazard the temperature at the cutting edge.

The invention will be understood best from the following description, taken in conjunction with the attached drawing wherein:

FIG. 1 is a perspective view of an exemplary cut in a tough new material—such as a metal clad composite plastic—which cannot be easily cut by conventional tools;

FIG. 2 is a perspective view of a fragment of the material in FIG. 1, showing the edge as it appears after having been cut by a prior art device;

FIG. 3 is a vertical elevation view of a prior art router used to make the cut of FIG. 2;

FIG. 4 is a vertical elevation of a preferred embodiment of the inventive router;

FIG. 5 is a perspective view of a single cutting edge on one flute taken from the preferred embodiment of FIG. 4;

FIG. 6 is a plan view looking upwardly from line 6—6 of FIG. 4;

Figure 10:
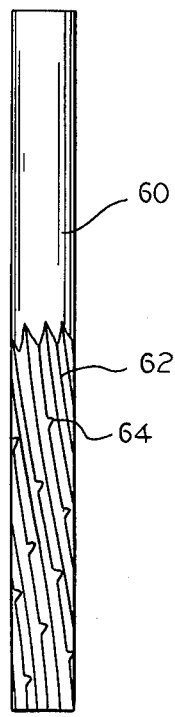
Figure 11:
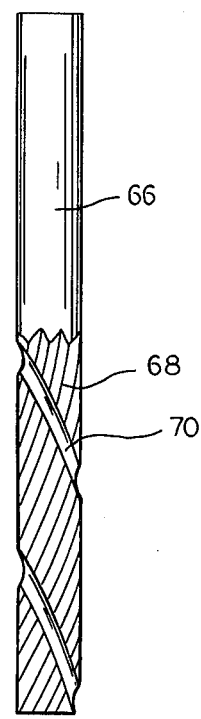
Figure 12:
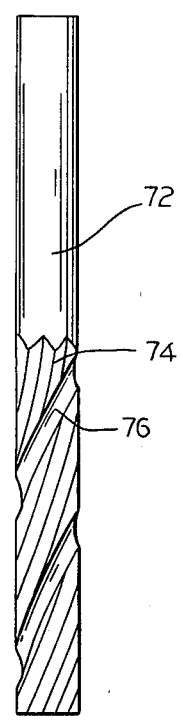

FIG. 7 graphically illustrates the pitches of the cutting and cleaning flutes;

FIG. 8 shows the rake angle of a clean out flute on the inventive router of FIG. 4;

FIG. 9 shows the rake angle of the cutting tooth on the inventive router of FIG. 4; and FIGS. 10-12 show three alternative embodiments of the inventive router.

An exemplary use of the inventive router is shown by FIG. 1. Here a planar substrate sheet 20 may be made of any suitable material, with a surface layer 22 laminated thereto. In one embodiment, the substrate 20 is a resin filled with boron fibers and the surface layer is an extremely thin sheet of aluminum. As here shown, a kerf 24 has been cut or milled into the laminate 20, 22, by means of the router of FIG. 4. While material of this type may find use almost anywhere, an examplary use might be as panels for airplane wings, wheel well doors, or the like.

Prior art cutters (FIG. 3) have tended to cut, tear, gouge and feather the material, as shown in FIG. 2. The cutter of FIG. 3 has a plurality of spiral flutes 26, 28, turned in opposite directions. The lands between the flutes are milled to form points which tend to score, abrade cut, gouge and tear their way. Also, the material being cut by the cutter of FIG. 3 tends to chatter as it is being cut. As seen in FIG. 2, the cutter of FIG. 3 generally causes a slight delamination between layers 20, 22 and substantial feathering of the surface layer 22 at the cut edge. The fibers of the composite plastic substrate material tend to form a fringe 34 which prevents a smooth butt joint and which results in a deterioration of the appearance of a finished product.

Aside from the imperfect edge cut, seen in FIG. 2, the cutter of FIG. 3 causes health-hazardous dust and chips which are extremely dangerous if inhaled into the lungs.

Also, the cutter generates great friction and heat to a degree where there is a loss of metal strength. The cutting edges dull and the cutter may snap off. Also, the dust and chips tend to clog the spiral flutes of the cutter and, as heat increases, to fuse into a solid mass.

The inventive cutter of FIG. 4 has two completely separate sets of flutes. A first set (nine in one example) of flutes 40 have a slow spiral along a rod 42 which is preferably made of carbide. The edges of each of the cutter flutes 40 are sharp, to provide a cutting action. A second set (two in one example) of flutes 44 have a fast spiral and have a U-shaped cross section to provide a substantial open space. The cross section of the clean out flutes 44 is large enough to carry away any chips or sawdust which may be formed by the cutter flutes 40.

Also, the direction of the spiral pitch of the two sets of flutes and the direction A of the turning during cutting is such that all chips, dust, and other cutting debris are carried downwardly and not upwardly. (In one embodiment involving a plastic-aluminum laminate, the inventive router turned at a speed of 22000 RPM). The mutual directional relationships push the cutting debris downwardly toward the underlying work piece support. A suction intake 46 is positioned beneath the cutter, in a position where the debris falls, as it is conveyed downwardly by the cleaning flute 44. This intake 46 leads to a vacuum cleaner which whisks away the debris. As part of the vacuum intake, a draft of air is drawn through the flutes 40, 44, which both cools the cutter and helps convey away the chips, dust, and other debris. More air is drawn through the flutes than with prior art devices, thereby prolonging the life of the router and maintaining its efficiency.

The lower end 48 of the cutter may have any convenient configuration such as: no end cut, burr end cut, mill end cut, or a drill point. It is here shown, by way of example, as having a drill point. The plan view of FIG. 6 shows the drill point with each of the cleaning flutes 44 terminating in a chip clearance area. The nine cutting flutes 40 are equally spaced around the perimeter of the rod 42, one of the cutting flutes being shown in enlarged scale in FIG. 5.

The cutting flutes have a slow spiral which forms a pitch angle B, (FIG. 7) with respect to an edge of the router or the axis of the rod 42. For the described tool and material, pitch angle B is preferably in the range of 10°–18°. The cleaning flute 44 forms a fast spiral having a pitch angle C, which may be in the range of 43°–55° and is preferably in the range of 47°–51°.

The two spirals 40, 44 must overlap each other in the range of any one circumference, regardless of the vertical position on the cutter. Stated another way, if the cutter of FIG. 4 is used to cut the kerf 24 of FIG. 1, there must always be at least one cutting edge 40 and one cleaning flute 44 in the area where the cutter encounters the material as it is being cut, regardless of whether cutting occurs nearer the top or the bottom of the flutes.

The rake angles of the two flutes are seen in FIGS. 8, 9. If a radial line is drawn from the axis X of rod 42 to the peripherial edge, a rake angle D, taken with respect to this radial line, may be formed at the periphery of the rod. For the cleaning flute 44, this rake angle D may be in the range of 0° to 10° and preferably is 5°. The rake angle E of the cutting flute 44 is in the range of 13°–17° and is preferably 15°.

The vertical orientation of these two flutes is seen in FIG. 5. As is apparent from an inspection of FIG. 5, the flute 40 might be described as a cutting edge which is periodically interrupted by the cleaning flute 44. It is important for the interval between the flutes and the widths 50, 52 of the flutes to be sufficient to preclude the lands from becoming a point, as in the prior art cutter of FIG. 3. Stated another way, the widths 50, 52 of the two flutes should leave a cutting edge which shears and does not claw the material when kerf 24 is formed.

The preferred embodiment described was tested and found to have a life span approaching 250% of the life span of the prior art cutter of FIG. 3, with almost none of its more objectional features. Also, the test model did not feather the surface metal 22 (FIG. 1) and left only a very little amount of the bottom fringe 34.

Three additional embodiments of the inventive cutter are seen in FIGS. 10–12, each of which may find a particular advantage depending upon the materials being cut and the manner of making the cut. In FIG. 10, the cutter 60 has slowly spiraling cutting flutes 62, which correspond generally to the cutting flute 40 of FIGS. 4, 5. However, the cleaning flute 44 is replaced by a series of interruptions (which might be described as nicks) spiraling down the length of the cutter flutes.

In FIG. 11, the cutter 66 has cutting flutes 68 which have a fast spiral in one direction while the cleaning flutes 70 have a slow spiral turned in the opposite direction. In FIG. 12, the cutter 72 has fast spiral cutting flutes 74 and slow spiral cleaning flutes 76 turned in the same direction.

Those who are skilled in the art will readily perceive how to modify the invention. Therefore, the appended claims are to be construed to cover all equivalent structures which fall within the true scope and spirit of the invention.

I claim:

1. A router comprising a shaft having at least two intersecting sets of flutes formed thereon, wherein each of said flutes is turned in the same direction, said two sets overlapping in any circumference of said shaft, each flute in a first of said sets having an edge for cutting a kerf, and each flute in a second of said sets having a relatively large cross-section to carry debris cut away by said first set, the pitch angle of both sets of said flutes and the cutting edge of said first set of flutes being such that said router turns in a direction which drives cutting debris downwardly.

2. The router of claim 1 wherein said first set of flutes is turned in one direction and said second set of flutes is turned in an opposite direction.

3. The router of any one of the claims 1 or 2 wherein said first set of flutes is a slow spiral and said second set of flutes is a fast spiral.

4. The router of any one of the claims 1 or 2 wherein said first set of flutes is a fast spiral and said second set of flutes is a slow spiral.

5. The router of any one of the claims 1 or 2 wherein the rake angle of said first set of flutes is in the range of 13°–17°.

6. The router of claim 5 wherein said rake angle is 15°.

7. The router of any one of the claims 1–3 wherein the rake angle of said second set of flutes is 0°–10°.

8. The router of claim 5 wherein the rake angle of said second set of flutes is 5°.

9. The router of claim 1 and means responsive to the agitation of air by a rotation of said router for drawing a draft of air through said flutes during cutting.

10. A carbide router having a plurality of intersecting and overlapping flute means turning in the same direction and uniformly distributed around the periphery of a rod, one end of said rod being adapted to be held in a machine tool, the other end of said rod being a free end, some of said flutes having a slow spiral and sharpened cutting edges, at least one other of said flutes having a fast spiral and a large clean out cross section, the direction of said spirals driving cutting debris downwardly toward said free tip of said rod.

11. The router of claim 10 wherein said slow spiral has a pitch angle of 10°–18°.

12. The router of claim 10 or 11 wherein said fast spiral has a pitch angle of 43°–55°.

13. The router of claim 10 or 11 wherein the rake angle of some of said flutes is in the range of 13°–17°.

14. The router of claim 10 or 11 wherein said flute with a fast spiral has a rake angle of 0°–10°.

* * * * *

UNITED STATES PATENT AND TRADEMARK OFFICE
CERTIFICATE OF CORRECTION

PATENT NO. : 4,395,167

DATED : July 26, 1983

INVENTOR(S) : Fred Maternus

It is certified that error appears in the above—identified patent and that said Letters Patent is hereby corrected as shown below:

Column 1, Line 8, "liminated" should be --laminated--

Column 1, Line 48, "nearly" should be --near--

Column 2, Line 12, insert --and-- after "hazard"

Column 4, Line 64, "claim 5" should be --claim 7--

Signed and Sealed this

Twenty-seventh Day of September 1983

[SEAL]

Attest:

GERALD J. MOSSINGHOFF

Attesting Officer

Commissioner of Patents and Trademarks